(12) United States Patent
Sabin et al.

(10) Patent No.: US 7,695,846 B2
(45) Date of Patent: Apr. 13, 2010

(54) MEMBRANE BASED ELECTROCHEMICAL CELL STACKS

(75) Inventors: Paul Sabin, Needham, MA (US); Peter Rezac, Marlborough, MA (US); Paul Osenar, Westford, MA (US); Mohammad Enayetullah, Sharon, MA (US)

(73) Assignee: Protonex Technology Corporation, Southborough, MA (US)

( * ) Notice: Subject to any disclaimer, the term of this patent is extended or adjusted under 35 U.S.C. 154(b) by 581 days.

(21) Appl. No.: 10/535,559

(22) PCT Filed: Nov. 18, 2003

(86) PCT No.: PCT/US03/37127

§ 371 (c)(1),
(2), (4) Date: Jan. 4, 2006

(87) PCT Pub. No.: WO2004/047210

PCT Pub. Date: Jun. 3, 2004

(65) Prior Publication Data

US 2006/0127735 A1 Jun. 15, 2006

Related U.S. Application Data

(60) Provisional application No. 60/427,261, filed on Nov. 18, 2002.

(51) Int. Cl.
*H01M 2/08* (2006.01)
*H01M 2/14* (2006.01)
(52) U.S. Cl. .......................................... 429/36; 429/38
(58) Field of Classification Search .................. 429/35, 429/38, 26, 36
See application file for complete search history.

(56) References Cited

U.S. PATENT DOCUMENTS

| 6,057,054 | A | 5/2000 | Barton et al. |
| 6,080,503 | A * | 6/2000 | Schmid et al. ................. 429/35 |
| 6,596,427 | B1 | 7/2003 | Wozniczka et al. |
| 6,602,632 | B2 | 8/2003 | Wakahoi et al. |
| 6,946,210 | B2 | 9/2005 | Osenar et al. |
| 7,306,864 | B2 * | 12/2007 | Osenar et al. ................. 429/30 |
| 2001/0019791 | A1 | 9/2001 | Gooch et al. |
| 2002/0031698 | A1 | 3/2002 | Inoue et al. |
| 2002/0045084 | A1 | 4/2002 | Fujii et al. |
| 2003/0096153 | A1 | 5/2003 | Osenar et al. |
| 2005/0244703 | A1 | 11/2005 | Osenar et al. |

FOREIGN PATENT DOCUMENTS

| EP | 1302996 A2 | 4/2003 |
| WO | WO-96/20509 | 7/1996 |
| WO | WO-02/43173 | 5/2002 |
| WO | WO-03/036747 | 5/2003 |
| WO | WO-03/092096 | 11/2003 |
| WO | WO-2004/027896 | 1/2004 |

* cited by examiner

*Primary Examiner*—Patrick Ryan
*Assistant Examiner*—Thomas H. Parsons
(74) *Attorney, Agent, or Firm*—Christine C. O'Day; George N. Chaclas; Edwards Angell Palmer & Dodge LLP

(57) ABSTRACT

The present invention provides membrane cassettes and stacks thereof which are suitable for a use in a variety of electrochemical applications. The invention further provides membrane cassettes which comprise one or more composite membrane electrode assemblies which have a peripheral gasket where the gasket has at least one groove or channel for introducing and distributing a sealant about the cassette. In certain preferred embodiments, the invention provides cassettes and stacks which are suitable for use in fuel cell applications.

48 Claims, 16 Drawing Sheets

FIG. 7A
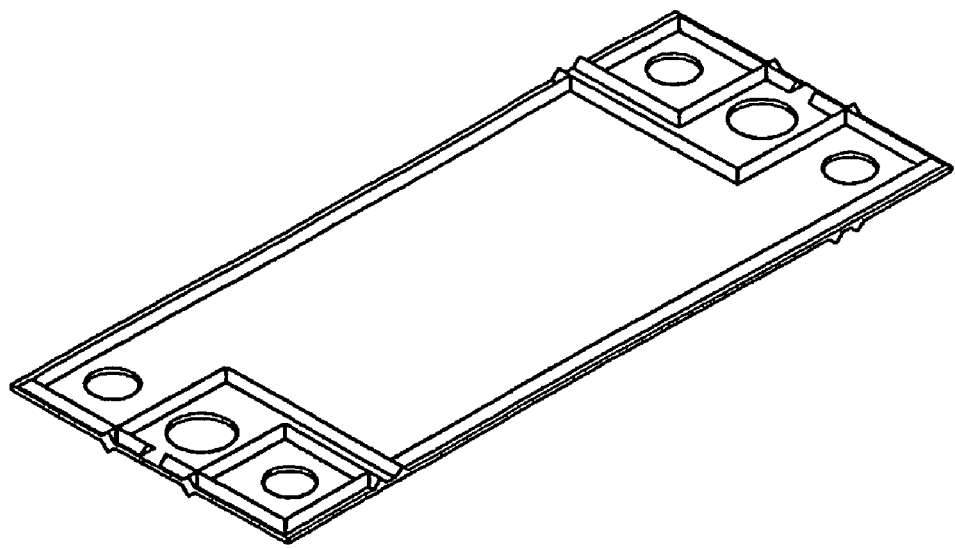
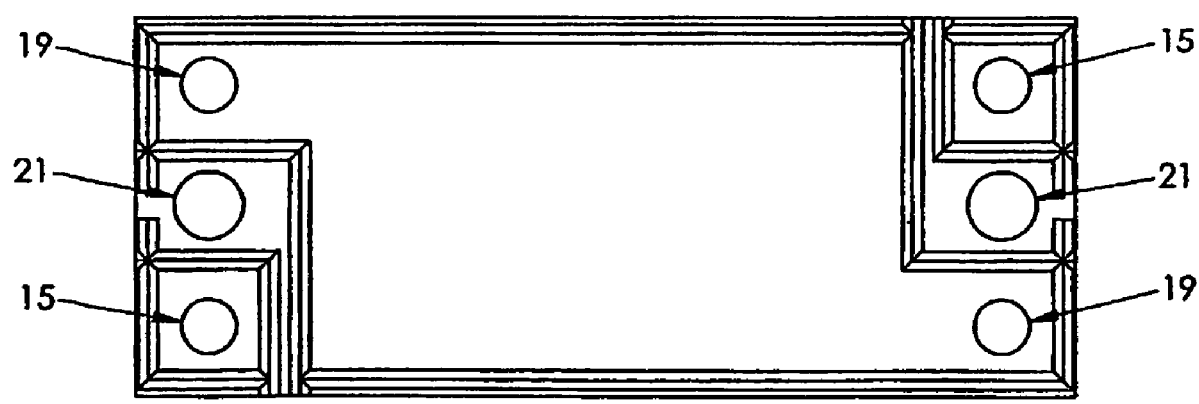
FIG. 7B

FIG. 8A
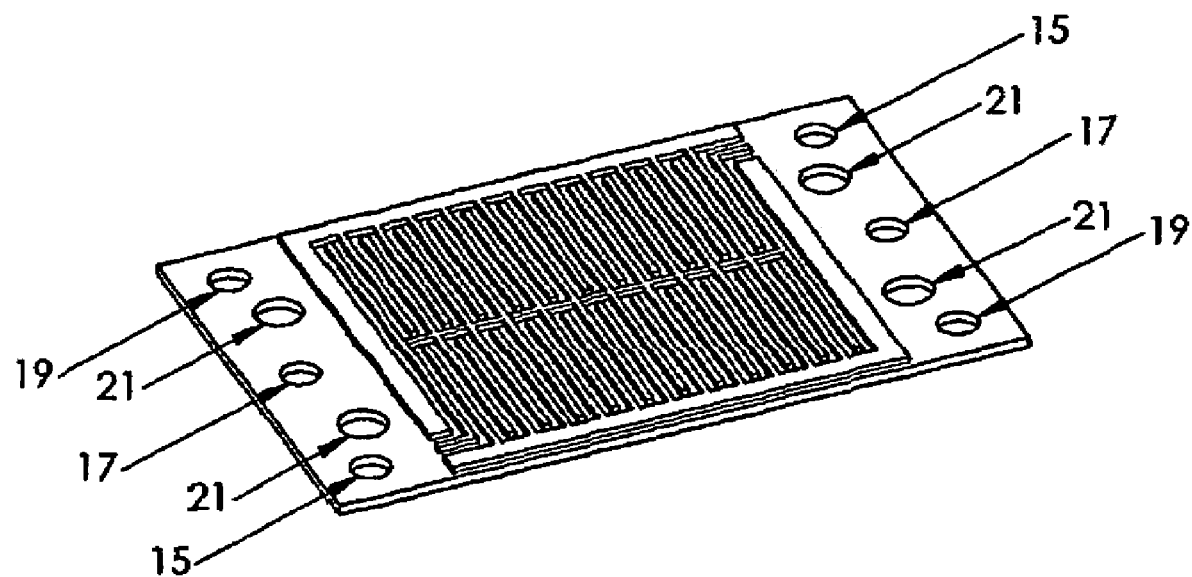
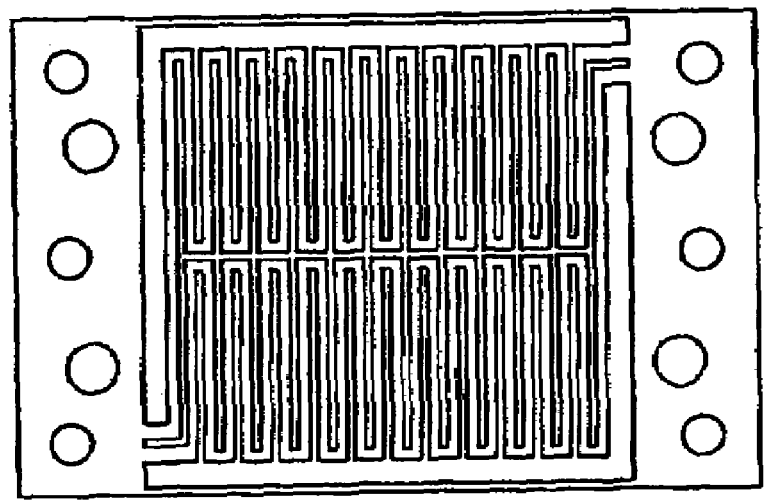
FIG. 8B

MEMBRANE BASED ELECTROCHEMICAL CELL STACKS

The present application is a 371 of International Application No. PCT/US03/37127, filed on Nov. 18, 2003, which claims the benefit of U.S. Provisional Application No. 60/427,261, filed on Nov. 18, 2002.

FIELD OF INVENTION

This invention relates to membrane-based electrochemical cells, and more particularly, to proton exchange membrane (PEM) fuel cell stacks. The present invention also describes novel processes for producing these PEM fuel cell stacks.

BACKGROUND OF THE INVENTION

Membrane based electrochemical cells, and particularly, proton exchange membrane (PEM) fuel cells are well known. PEM fuel cells convert chemical energy to electrical power with virtually no environmental emissions and differ from a battery in that energy is not stored, but derived from supplied fuel. Therefore, a fuel cell is not tied to a charge/discharge cycle and can maintain a specific power output as long as fuel is continuously supplied. The large investments into fuel cell research and commercialization indicate the technology has considerable potential in the marketplace. However, the high cost of fuel cells when compared to conventional power generation technology deters their widespread use. The cost of fabricating and assembling fuel cells can be significant, due to the materials and labor involved. Indeed, as much as 85% of a fuel cell's cost can be attributed to manufacturing.

A single cell PEM fuel cell consists of an anode and a cathode compartment separated by a thin, ionically conducting membrane. This catalyzed membrane, with or without gas diffusion layers, is often referred to as a membrane electrode assembly ("MEA"). Energy conversion begins when the reductants and oxidants, are supplied to the anode and cathode compartments, respectively, of the PEM fuel cell. Oxidants include pure oxygen, oxygen-containing gases, such as air, and halogens, such as chlorine. Reductants, also referred to herein as fuel, include hydrogen, natural gas, methane, ethane, propane, butane, formaldehyde, methanol, ethanol, alcohol blends and other hydrogen rich organics. At the anode, the reductant is oxidized to produce protons, which migrate across the membrane to the cathode. At the cathode, the protons react with the oxidant. The overall electrochemical redox (reduction/oxidation) reaction is spontaneous, and energy is released. Throughout this reaction, the PEM serves to prevent the reductant and oxidant from mixing and to allow ionic transport to occur.

Current state of the art fuel cell designs comprise more than a single cell, and in fact, generally combine several MEAs, flow fields and separator plates in a series to form a fuel cell "stack"; thereby providing higher voltages and the significant power outputs needed for most commercial applications. Flow fields allow for the distribution of the reactants through the fuel cell and are typically separate from the porous electrode-layers within the fuel cell. Depending on stack configuration, one or more separator plates may be utilized as part of the stack design to prevent mixing of the fuel oxidant and cooling input or exhaust streams within the fuel cell stack. Such separator plates also provide structural support to the stack.

Bipolar plates perform the same function as an oxidant flow field, fuel flow field and separator plate in combination and are often used in the design of fuel cells as their use can reduce the number of components required in the functioning fuel cell. These bipolar plates contain an array of channels formed in the surface of the plate contacting an MEA which function as the flow fields. The lands conduct current from the electrodes while the channels between the lands serve to distribute the reactants utilized by the fuel cell and facilitate removal of liquid reaction by-products, such as water. Fuel is distributed from the fuel inlet port to the fuel outlet port, as directed by the channels, on one face of the bipolar plate, while oxidant is distributed from the oxidant inlet port to the oxidant outlet port, as directed by the channels, on the opposing face of the bipolar plate, and the two faces are not connected through the plate. In the fuel cell stack, each bipolar plate serves to distribute fuel to one MEA of the stack through its fuel flow field face while distributing oxidant to a second MEA through the its opposite oxidant flow field face. The particular design of the bipolar plate flow field channels may be optimized for the operational parameters of the fuel cell stack, such as temperature, power output, and gas humidification. Ideal bipolar plates for use in fuel cell stacks are thin, lightweight, durable, highly conductive, corrosion resistant structures such as carbon/polymer composites, graphite or certain metals.

In the flow fields, the lands conduct current from the electrodes, while the grooves between the lands serve to evenly distribute the reactants utilized by a fuel cell, such as hydrogen, oxygen or air, over the faces of the electrodes. The channels formed by the lands and grooves also facilitate removal of liquid reaction byproducts, such as water. A thin sheet of porous paper, cloth or felt, usually made from graphite or carbon, may be positioned between each of the flow fields and the catalyzed faces of the MEA to support the MEA where it confronts grooves in the flow field to conduct current to the adjacent lands, and to aid in distributing reactants to the MEA. This thin sheet is normally termed a gas diffusion layer ("GDL"), and can be incorporated as part of the MEA.

Fuel cell stacks may also contain humidification channels within one or more of the coolant flow fields. These humidification channels provide a mechanism to humidify fuel and oxidants at a temperature as close as possible to the operating temperature of the fuel cell. This helps to prevent dehydration of the PEM as a high temperature differential between the gases entering the fuel cell and the temperature of the PEM causes water vapor to be transferred from the PEM to the fuel and oxidant streams.

Of necessity, certain stack components, such as the GDL portion of the MEA, are porous in order to provide for the distribution of reactants and byproducts into, out of, and within the fuel cell stack. Due to the porosity of elements within the stack, a means to prevent leakage of any liquid or gases between stack components (or outside of the stack) as well as to prevent drying out of the stack elements due to exposure to the environment is also needed. To this end, gaskets or other seals are usually provided between the surfaces of the MEA and other stack components and on portions of the stack periphery. These sealing means, whether composed of elastomeric or adhesive materials, are generally placed upon, fitted, formed or directly applied to the particular surfaces being sealed. These processes are labor intensive and not conducive to high volume manufacturing, thereby adding to the high cost of fuel cells. Additionally, the variability of these processes results in poor manufacturing yield and poor device reliability.

Fuel cell stacks range in design depending upon power output, cooling, and other technical requirements, but may utilize a multitude of MEAs, seals, flow fields and separator plates, in intricate assemblies that result in manufacturing difficulties and further increased fuel cell costs. These multitudes of individual components are typically assembled into one sole complex unit. The fuel cell stack is formed by compressing the unit, generally through the use of end plates and bolts, although banding or other methods may be used, such that the gaskets seal and the stack components are held tightly together to maintain electrical contact there between. These conventional means of applying compression add even more components and complexity to the stack and pose additional sealing requirements.

Other disadvantages observed in connection with some conventional fuel cell stacks are electrical in nature. For example, depending upon the configuration of the fuel cell and the degree of exposure of the MEA to the reactants and waste streams in the various manifolds providing reagents and coolants to the flow fields, a cross-cell potential problem may arise. In particular, if the exposure of the MEA to those reagents is significant, there may be a "shorting-out" of the MEA layer, thus resulting in poor performance of the fuel cell overall. Also, exposure of the MEA to some potential cooling fluids can be detrimental to the membrane portion. For example, in certain combinations of MEA and coolant, the coolant is capable of solvating or swelling the exposed portions of the membrane which can induce damage to the MEAs.

Various attempts have been made in the fuel cell art to address these deficiencies in fuel cell stack assembly design and thereby lower manufacturing costs. However, most require manual alignment of the components, active placement of the sealing means and/or a multi-step process.

Certain conventional processes are described in U.S. Pat. No. 6,080,503, to Schmid et al., U.S. Pat. No. 4,397,917, to Chi et al., U.S. Pat. No. 5,176,966, to Epp et al., and U.S. Pat. No. 5,264,299, to Krasij et al. However, notable disadvantages have been associated with those processes.

For example, U.S. Pat. No. 6,080,503, to Schmid et al. describes the replacement of gasket based seals within certain portions of the stack with an adhesive based material in the form of tapes, caulks or layers. However, assembly of that stack still requires manual alignment of the components during the adhesion process, in a manner not unlike caulking a seal, and sealing only occurs at those interfaces where adhesive has been applied through active placement.

Similarly, U.S. Pat. No. 4,397,917, to Chi et al., describes the fabrication of subunits within a fuel cell stack and is reported to provide ease in handling and testing. However, this design relies on conventional sealing among the components and between subunits. In addition, no manifolds internally penetrate the subunit.

See also, U.S. Pat. No. 5,176,966, to Epp et al., for its method of forming at least some of the required gaskets directly into the fuel cell stack assembly; and U.S. Pat. No. 5,264,299, to Krasij et al., which describes a fuel cell module having a PEM interposed between the two porous support layers which distribute reactant to the catalyst layers in which the peripheral portion of the support layers are sealed with an elastomeric material such that the PEM is joined with the support layers and the open pores of the support layers are filled with the elastomeric material making it fluid impermeable.

Additionally, World Publication WO 02/093672 describes a process for sealing fuel cell stacks via the injection of liquid resin. The reported process requires that all of the stack components be assembled first; then seals are introduced to produce the fuel cell stack. While that process may offer certain improvements to those previously described state of the art methods for forming fuel cell stacks, several deficiencies remain. In practice, for example, the process requires high injection pressures and is associated with slow fill times. High injection pressures further require component designs that protect the more fragile components of the stack (i.e. MEA). Another notable disadvantage is that a significantly large area of the each layer is necessarily sacrificed due to the sealing process itself.

Still further, in traditional fuel cell cassettes, two types of MEAs dominate; MEAs in which 1) the membrane extends beyond the borders of the gas diffusion layers, and 2) the gasket materials are formed into the edges of the MEA itself (with the membrane and GDLs approximately of the same size and shape, see for example U.S. Pat. No. 6,423,439 to Ballard). In the first type, separate gasket materials are used to seal between the membrane edge extending beyond the GDL and the other part of the stack (bipolar plates). In the second type, it is possible to seal directly to the other parts of the stack. Each of these methods requires compression to make a seal. These compressive-based seals require that all the components in the stack have high precision such that a uniform load is maintained. MEA suppliers have become accustomed to supplying the MEA formats discussed above.

In our previous patent applications, we have reported on an innovative fuel cell stack design which assembles together individual modules to form a fuel cell stack of requisite power output where each module permanently binds a number of unit cells together (see, World Publication WO 02/43173, the entirety of which is incorporated by reference).

Briefly, WO 02/43173 details a three-step process for the formation of fuel cell cassettes characterized by the following:

1) Sealing of unused manifold openings/ports on each of the particular flow fields (fuel, oxidant, and coolant). For example, in the case of the oxidant flow field, ports utilized for the distribution of fuel and coolant (on other layers) must be sealed about their perimeter to prevent the mixing of these input streams.

2) Sealing of all the ports within the membrane electrode assemblies (MEA) to prevent the leakage of the reactants within the MEA layers.

3) Layering these components (appropriately sealed as described) within a mold or fixture in a method prescribed by the particular stack design. Once the pieces are assembled within the fixture, a resin is introduced about the periphery. Using vacuum transfer molding or injection molding techniques, the resin is forced into the edges of the cassette assembly. Once hardened, it provides structural support and edge sealing over the assembly.

The resulting fuel cell cassette is then transformed into a fuel cell stack with the addition of end plates. Such a construction provides appropriate manifolding and a means of compression.

We also have developed innovative methods for sealing manifold ports within the stack or a module thereof, as well as methods for sealing the stack or module periphery that are less labor intensive and more suitable to high volume manufacturing processes (see World Publications WO 03/036747 and WO 03/092096, the entirety of which are incorporated by reference).

Despite even our own advancements in the field, it would be desirable to provide an improved fuel cell stack design that is less complex, more reliable, and less costly to manufacture. Additionally, it would be highly desirable to provide a method of making fuel cell cassettes utilizing roll-to-roll production of MEA, particularly, as this would greatly reduce the cost of this component. It also would be highly desirable to develop improved fuel cell cassettes which minimize or prevent exposure of the MEA to the reactants, waste streams, or cooling fluids around the various manifolds, thus avoiding cross-cell potential problems or material incompatibility associated with that exposure. Still further, it would be highly desirable to develop improved fuel cell stacks which can be formed at reduced injection pressures to simplify component design and which do not require that a significantly large area of the each layer to be sacrificed to accommodate the sealing process.

SUMMARY OF THE INVENTION

The present invention provides notable improvements over conventional stacks and related processes, including those described above. In particular, the present invention provides improved electrochemical cassettes and fuel cell cassettes, including fuel cell stacks utilizing composite MEAs. As used herein, "composite MEA" is intended to refer to traditional laminated MEAs having an ion conductive membrane (ICM) interposed between two gas diffusion layers (GDL) which is then bonded about the periphery of the laminate with a non-porous, insulating gasket. Each sealed stack module, referred to herein as a "fuel cell cassette" or "electrochemical cassette" is an assembly of electrochemical components which has bonded internal manifolding and is sealed to form a self contained unit. These electrochemical or fuel cell cassettes may be designed to readily achieve standardized specifications.

In accordance with the present invention, sealing channels are formed in the gasket of the composite MEA. This allows for significant simplification of the other portions of the stack, particularly simplification of the non-porous separator plate. Rather than forming an edge gasket around the MEA that is flat, composite membranes are prepared which comprise a gasket that incorporates the sealing channels into the gasket of the composite MEA. A stack can subsequently be made with simple flow fields (e.g. metal screens) and flat separator plates (e.g. sheet stock) or by utilizing bipolar plate components. During the fabrication of the cassette, the sealant is introduced from the edges of the stack (or through sealant holes in the stack components). The sealant travels through the channels incorporated in the gasket of the MEA, bonding to the gasket and the separator plate.

Preferred cassettes of the invention generally comprise at least one membrane electrode assembly adapted for contact with at least two plates, each plate comprising one or more flow fields. Each flow field comprises at least one groove or other conduit which facilitates or otherwise enables flow therethrough. Individual flow fields are selected from oxidant flow fields, fuel flow fields, and coolant flow fields. Flow fields may be integrated into the surface of a separator plate, e.g., a bipolar plate, or the flow fields may be separate porous components which permit a gas or fluid to have contact with substantially all of the MEA in contact with the flow field. In preferred cassettes having a separate flow field component, e.g., a flow field screen, the adjacent composite MEA and separator plate define a space in which the flow field is situated during assembly. In accordance with the present invention, each membrane electrode assembly and each plate comprise at least one oxidant manifold opening and at least one fuel manifold opening, with each respective manifold opening extending through the thickness of the cassette. Each composite MEA preferably has at least one sealant channel which extends through at least a portion of the thickness thereof and each separator plate or bipolar plate may optionally have one or more additional sealant channels which extends through at least a portion of the thickness thereof.

Also in accordance with the invention, the one or more membrane electrode assemblies and plates are assembled and encapsulated about the periphery thereof by a sealant. The sealant contemporaneously seals the respective channels of the one or more composite MEAs and optionally one or more plates to selectively block one or more manifold openings or manifold ports in proximity thereto. In that way, certain manifold openings within each particular layer selectively remain closed or open and undesired flow is reduced or eliminated.

Through the number, shape, and placement of sealant holes (optional) and channels cut or otherwise formed within the composite MEA and optionally the plate components of the fuel cell stack, sealing resin is introduced into the assembly to seal the perimeter of the assembly and to seal certain manifold ports within the assembly. In certain preferred embodiments, the sealant holes and channels or groves are incorporated into the peripheral gasket of the composite MEA during the process of forming and bonding the gasket to a traditional MEA. Improved fuel cell stacks of the present invention can be manufactured from conventional fuel cell components and can utilize both injection molding and vacuum assisted resin transfer molding processes.

The present invention allows for the fabrication of fuel cell stacks with a minimum of labor, thereby dramatically reducing their cost and allowing for process automation. In addition, in the present invention the manifold openings are sealed by adhesion of the sealant to the fuel cell components, not by compression of the endplates or other compression means. This reduces the compression required on the final stack, improves the reliability of the seals, improves electrical contact and allows for the use of a wider variety of resins. Further, end plates may be molded into the fuel cell cassette thereby producing an entire stack (e.g., fuel cell cassette and end plates) in one step.

In one preferred embodiment, the present invention provides fuel cells having a composite MEA in which the GDL and membrane are of substantially the same general outline as each other have approximately the same outline as the adjacent flow fields (either flow field screens or flow fields of an adjacent bipolar plate). The gasket bonded about the periphery increases to overall outline of the composite MEA to about the same outline as that of the assembled stack profile. One advantage of these fuel cells is the ability to directly use a roll-to-roll MEA and to maximize the working area of the MEA incorporated into the stack. That is the MEA area used to bond (or seal) to the other components of the cassette is reduced by incorporation of the peripheral edge gasket. Moreover, the peripheral gasket prevents interaction of the MEA with reactants present in the manifolds of the cassette and thereby prevents or reduces cross-cell potential. Preferred composite MEAs of the invention are prepared by forming a molded peripheral edge gasket around the MEA using a mold which is capable of transferring a specified pattern of channels or grooves to the peripheral gasket. Typically, injection molding or pressure (or vacuum) assisted resin transfer molding techniques are used to form the composite MEA.

By way of illustration, the sealing process occurs as follows. Sealant that travels through channels present in the peripheral gasket of the composite MEA and optionally through channels cut in bipolar plates or separator plates bonds to both the gasket of the composite MEA and the adjacent plate to create a fluid tight seal. In certain embodiments, it may be desirable for one or more channels or groves in the bipolar plate to align with the GDL-gasket interface such that sealant introduced into the channel also blinds to that portion of the GDL proximate to the channel to provide improved sealing or to increase the composite MEA-plate bonding.

The present invention provides fuel cells having a composite MEA. The composite MEA preferably comprises a gasket affixed to the periphery of the MEA laminate structure. In preferred fuel cells comprising the composite MEA, the outline of the peripheral gasket is approximately the same size as the outline of the stack profile. The active portion of the MEA being located roughly in alignment with the reactant flow fields above and below in the assembled stack. The thickness of the gasket portion of the composite MEA may be substantially the same as the MEA laminate structure or the gasket may be thicker than the MEA laminate structure. In certain cassettes using separator plates and flow field screens, the gasket portion of the composite MEA is typically thicker than the MEA laminate structure. Typically the peripheral gasket extends above the surface of the MEA laminate structure by at least the thickness of the flow field screen. In certain preferred embodiments, compression of the cassettes during encapsulation induces compression of the peripheral gasket and thus reduces the thickness of the gasket. Thus, preferred peripheral gaskets typically are designed to extend above the surface of the MEA by at least the thickness of the flow field screen.

Preferred methods for producing cassettes of the invention generally comprise providing the various components of the cassette (e.g., one or more composite MEAs and plates, each comprising respective manifold openings, as further described herein) in a size and number suitable for the intended application, assembling the components in a design configuration to support output requirements for that application; and introducing a sealant into certain channels present in the composite MEAs (and optionally present in the plates). By sealing those channels, certain manifold openings which are not intended to deliver material to a particular flow field are selectively blocked, thus preventing or at least substantially reducing undesirable flow. In addition, the sealant can also encapsulate the perimeter of the assembly contemporaneously with the sealing of the channels.

Related aspects of the invention are discussed infra.

BRIEF DESCRIPTION OF THE DRAWINGS

FIG. 7A-B is a schematic top and side view of a composite MEA having a peripheral gasket comprising elevated ridges and raised channels;

FIG. 8A-B is a schematic top and side view of a bipolar plate comprising a flow field incorporated in relief on the surface thereof;

DETAILED DESCRIPTION OF THE INVENTION

The present invention provides a variety of cassettes suitable for use in electrochemical applications. As noted above, cassettes of the invention are particularly well suited for use in fuel cells.

For use in fuel cell applications, cassettes of the invention are typically utilized in the form of a stacked assembly comprising the following components: composite membrane electrode assemblies (composite MEAs), flow fields, and separator plates.

Figure 1:
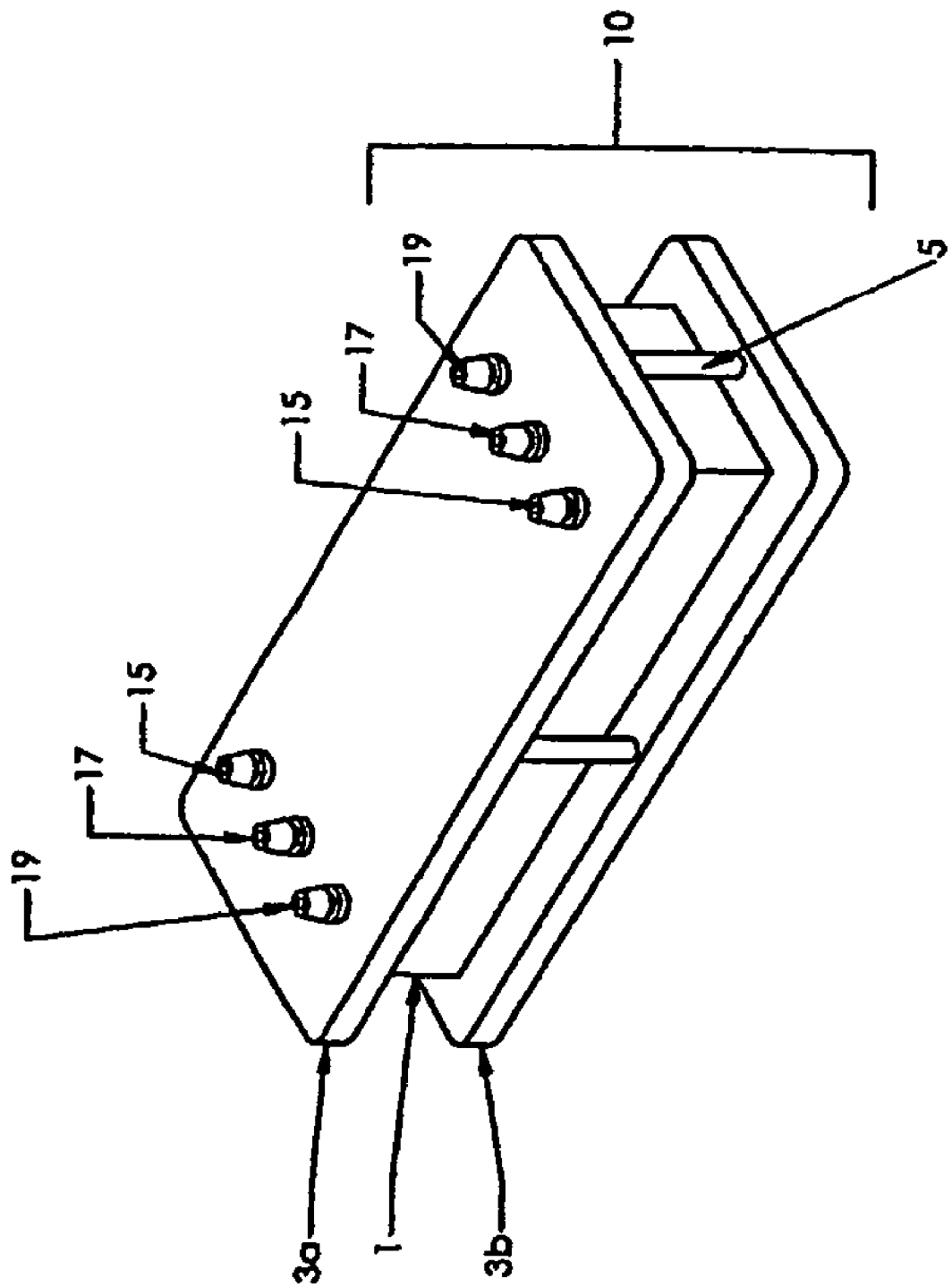
FIG. 1 is a pictorial view of one embodiment of a fuel cell stack of the present invention.

Referring now to the drawings, FIG. 1 shows one embodiment of a fuel cell stack 10 of the present invention. A fuel cell cassette 1, formed according to the methods described herein and comprising any number of composite MEAs, coolant flow fields, and either flow fields and separator plates or bipolar plates, is interposed between a top and bottom endplate 3a and 3b through a compression means 5. The fuel cell cassette may also utilize terminal plates or end plates at the top and bottom of the cassette, such terminal plates consisting of one-half of a bipolar plate structure (i.e. one flow field face only). Composite MEAs may be fabricated from materials known in the art or purchased commercially. In the preferred embodiment, a laminated MEA is manufactured by hot-pressing catalyzed carbon paper onto both sides of a NAFION perfluorinated sulfonic acid membrane (available commercially from E.I. DuPont de Nemours and Company, U.S.A.). The laminated MEA is placed in a mold and a peripheral gasket, which is bonded to the edge of the laminated MEA, is formed by vacuum assisted resin transfer, injection molding or the like. Fuel 15, oxidant 19, and coolant 17 inputs and outputs are also shown.

Figure 5:
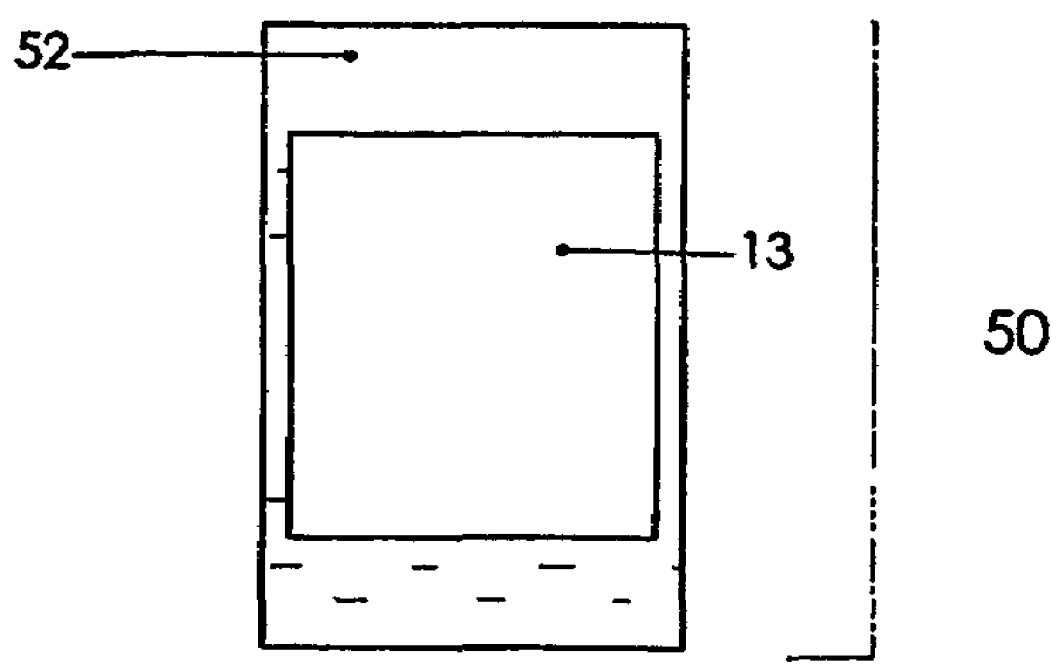
FIG. 5 is a pictorial top view of a composite MEA having a gasket region about the periphery of the MEA.

Certain preferred composite membrane electrode assemblies which are suitable for use in the fuel cell cassettes of the invention are shown in FIG. 5. As shown, the composite MEAs comprises a laminated membrane electrode assembly 13 which is surrounded about the periphery with a gasket 52 composed of a thermoset or thermoplastic elastomeric material. Typically preferred are membrane electrode assemblies which have a gasket composed of a thermoset material, particularly a silicone material. Although composite MEAs having a flat peripheral gasket are commercially available, no composite MEAs have been recited comprising a patterned peripheral gasket which patterning facilitates sealant distribution through the cassette during the sealing process. That is, no prior composite MEA has incorporated a peripheral gasket which has one or more grooves, channels or ports designed to distribute sealant during a sealing process.

Figure 2:
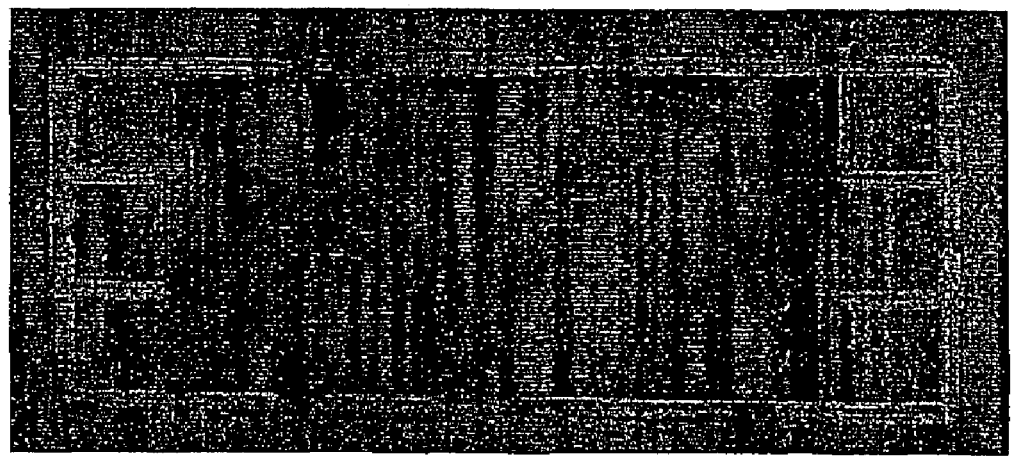
FIG. 2 is a photographic image of the composite MEA manufactured by vacuum resin transfer of a resin and a MEA using the mold depicted in FIG. 3 and FIG. 4.

Due to the porous nature of the GDL within the MEA, a gasket formed about the periphery of the MEA interpenetrates the GDL to form a bond with the MEA and blind the edges of the GDL. A photographic image of a composite MEA 50 after gasket formation is shown in FIG. 2 wherein the composite MEA 50 is prepared by placing a precut MEA in the mold depicted schematically in FIG. 3 and photographically in FIG. 4 and then forming the gasket about the periphery by vacuum assisted resin transfer molding (pull vacuum through the center holes pictured in FIG. 3 and FIG. 4) or injection molding. Typically, one or more channels or grooves are formed in the peripheral gasket by transferring a pattern present in the mold to the gasket during the manufacturing process. In conventional processes, the polymer membrane is required to extend past the GDL to provide a frame for sealing purposes. Consequently, this results in increased manufacturing costs. In contrast, the present invention allows sealing to occur when the GDL and polymer membrane are of substantially the same size and shape. The gasket resin binds to the polymer membrane and interpenetrates the edges of the GDL. This is advantageous as the composite MEAs used in the present invention may be fabricated on a continuous basis with the associated reduction in manufacturing costs using less of the laminated MEA (polymer membrane and GDL) and increasing cell or stack efficiency by preventing cross potential. Moreover, preferred molding processes contemplate production of a plurality of composite MEAs by stacking two or more molds as provided by FIG. 3 and FIG. 4 in series.

In one preferred embodiment, all of the fuel cell components are cut to roughly the same shape perimeter. Two series of manifold openings or ports, an inlet opening and an outlet opening for each reactant flow, are cut in the composite MEAs and (bipolar) plates to provide manifolding for fuel and oxidant flow through the cassette. Preferably manifold openings or ports are cut or formed in the peripheral gasket of the composite MEA. In an alternative embodiment, one or more coolant flow fields are also utilized, in which instance, an additional series of ports are cut in each component to provide for coolant input and output flow through the cassette. Sealing grooves are cut in each of the (bipolar) plates adjacent to the coolant flow field, through which a sealant can be guided to close off unused ports contemporaneously with the sealing of the entire fuel cell assembly to form the fuel cell cassette. Alternatively, the composite MEAs can be formed with similar groove structures. Using the shape and placement of the sealing grooves in each of the components, sealant flow into the component can be controlled. Grooves are not cut to surround ports that are not to be sealed on a particular layer.

Depending upon the length and geometry of the grooves, sealant flow from the edge of the assembly may not be adequate to completely seal off a port. In such instances, sealant holes are cut into the components and are utilized to draw additional sealant directly into the sealing grooves.

FIG. 12 to FIG. 15 depict various bipolar plates having sealant channels or groves and sealant ports designed to seal the edges and ports of bipolar plates. These bipolar plate designs were reported in WO 03/092096, the entirety of which is incorporated by reference.

In accordance with the invention, each of the sealant grooves, channels, and sealant manifold ports can also be incorporated as channels, grooves and ports in the periphery gasket of the composite MEAs of the present invention.

Figure 12:
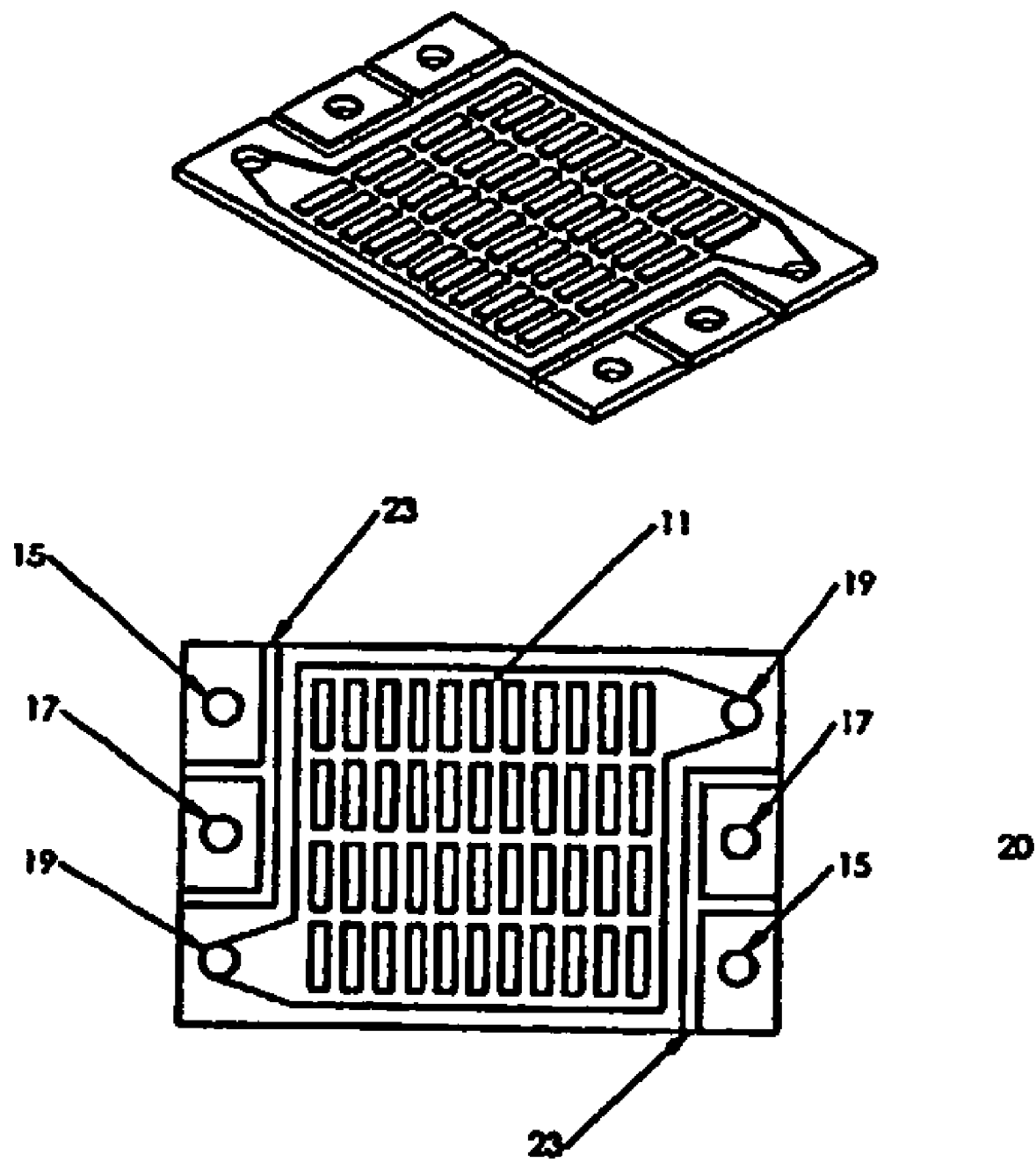
FIG. 12 is a pictorial top view of the oxidant flow field face of a bipolar plate of the present invention.

For example, FIG. 12 shows a sealing pattern of a bipolar plate having sealing grooves cut therein, which pattern is suitable for use in connection with the present invention. The sealing grooves 23 are added to each side of the bipolar plate 20. Such sealing grooves 23 are not connected to the flow field channel pattern 11 on the bipolar plate 20 face as the flow field channel pattern 11 must remain unhindered to provide for proper reactant flow through the cassette. These sealing grooves 23 are designed such that in the fuel flow field face of the bipolar plate 20, the fuel ports 15 remain open to distribute fuel while the remaining oxidant 19 and coolant 17 ports are sealed. In the opposing oxidant flow field face of the bipolar plate 20, the oxidant ports 19 remain open to distribute oxidant while all other ports are sealed. In FIG. 12, the oxidant flow field face of the bipolar plate 20 is shown. Therefore, sealing grooves 23 surround the fuel inlet and outlet ports 15 and the coolant inlet and outlet ports 17, but not the oxidant inlet and outlet ports 19.

Figure 13:
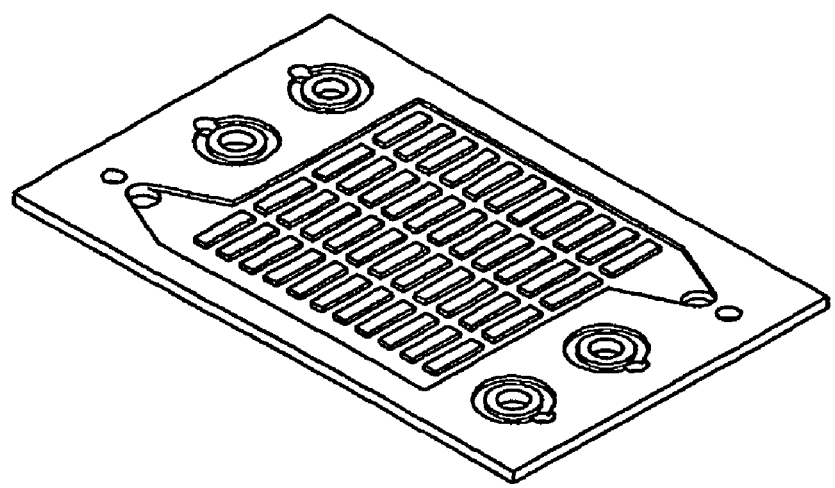
FIG. 13 is pictorial view of an embodiment of a sealing groove and sealant hole design for use with the present invention.
Figure 13:
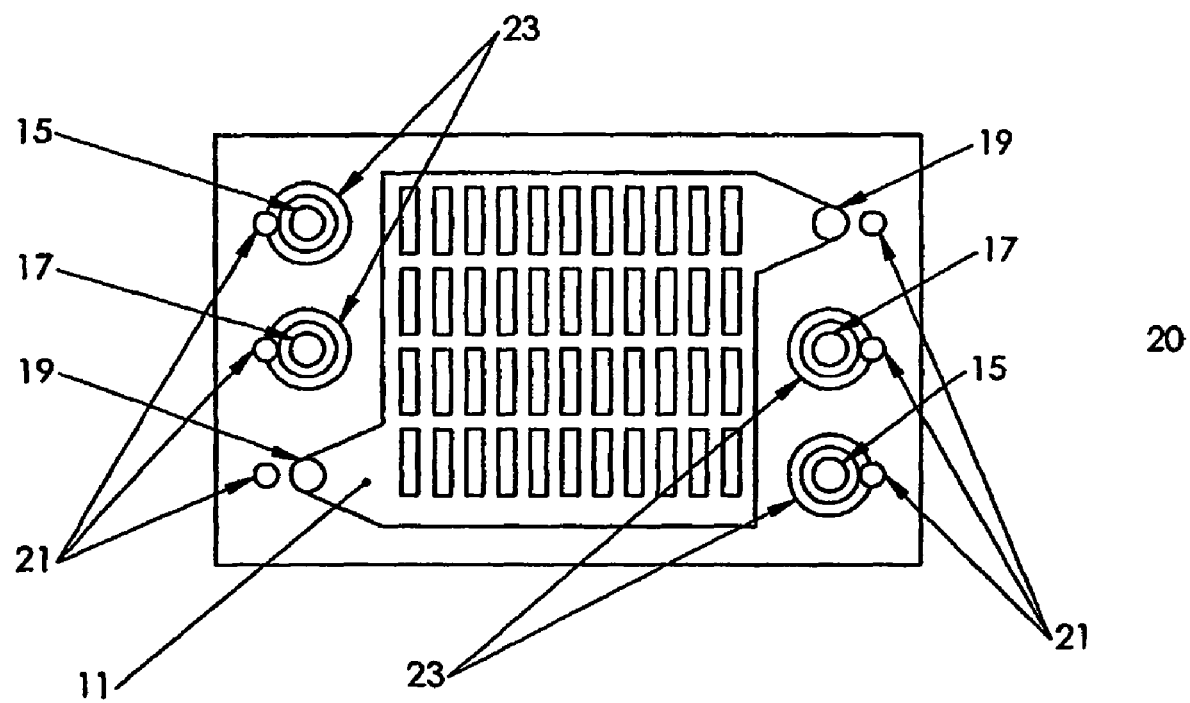

Referring now to FIG. 13, an alternative sealing groove 23 and sealant hole 21 design for a bipolar plate 20 is shown wherein sealant holes 21 are used and sealant is drawn (or pushed) from the sealant hole 21 into the sealing grooves 23 surrounding the fuel ports 15 and coolant ports 17 and sealant is drawn from the periphery of the assembly only to seal the periphery of the components. Sealant holes must also be added to the MEAs.

Figure 14:
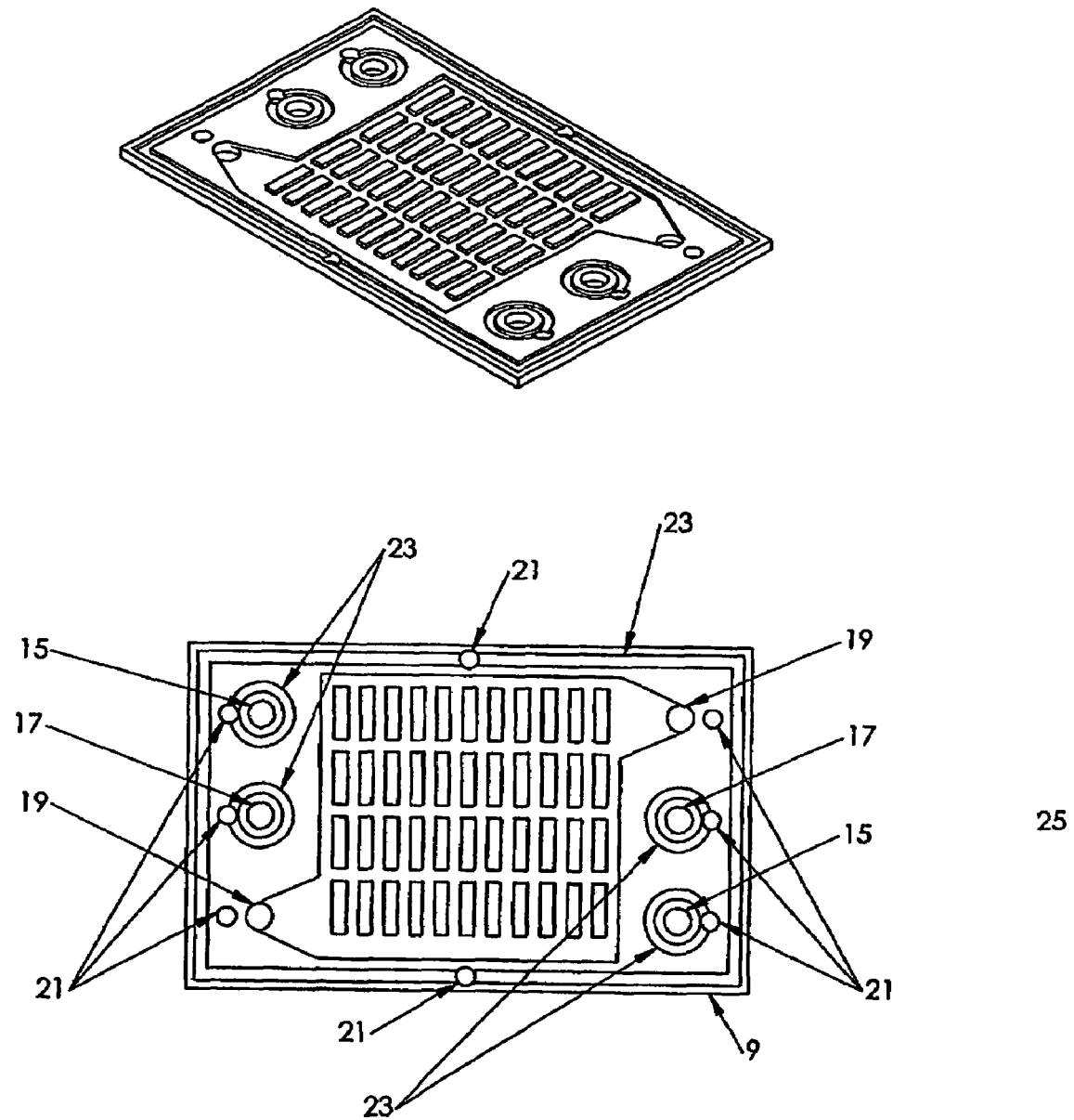
FIG. 14 is a pictorial view of another embodiment of a sealing groove and sealant hole design for use with the present invention.

Another embodiment of a sealing groove and sealant hole pattern is shown on a bipolar plate 20 in FIG. 14. As shown, sealant is drawn from the sealant holes 21 to seal the fuel ports 15 and coolant ports 17. The perimeter 9 and the sealing grooves 23 surrounding the ports are isolated from the sealing groove about the periphery 9 of the assembly. In this embodiment, bonding of the perimeter does not require external encapsulation of the entire assembly, which may be advantageous for heat removal.

Figure 15:
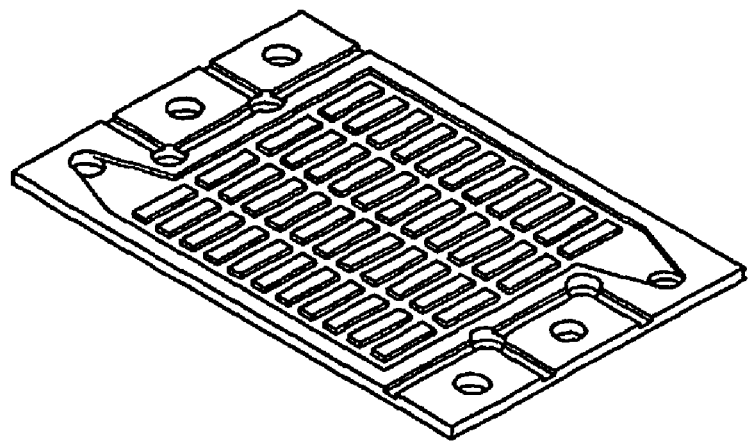
FIG. 15 is a pictorial view of yet another embodiment of a sealing groove and sealant hole design for use with the present invention.
Figure 15:
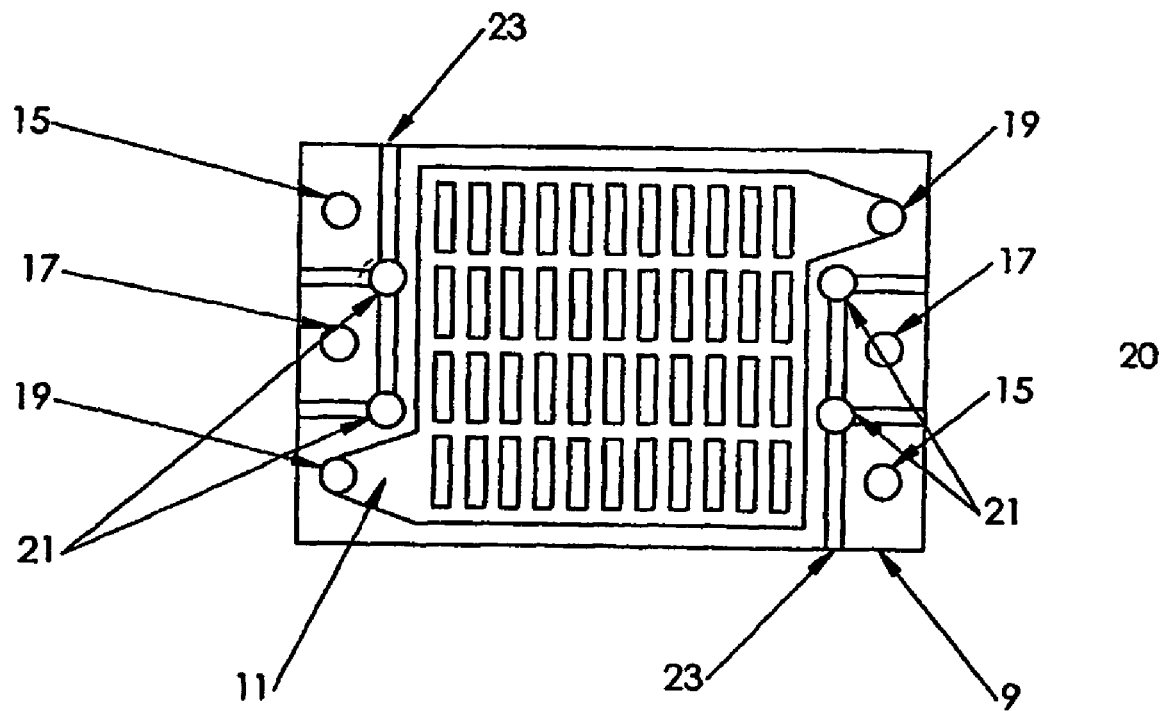

FIG. 15 depicts yet another embodiment of a sealing channel and sealant hole pattern in which the sealing grooves 23 are fed sealant from both the periphery 9 and through sealant holes 21 to seal the fuel ports 15 and coolant ports 17.

Once suitable sealant holes and/or sealing channels are cut or otherwise formed in each of the fuel cell components as described above, the components are assembled according to the desired cassette design and output requirements. Assembly of a fuel cell stack utilizing bipolar plates could include the use of terminal plates which incorporate one-half of a bipolar plate structure, i.e. only one flow field face.

In a very basic assembly design, a composite MEA is interposed between two terminal plates each having a single flow field pattern on one face thereof. That is, each terminal plate has a flow field in relief or etched into one surface and is then assembled with a composite MEA to form a one cell cassette. However, in another preferred embodiment the assembly design comprises, in this order, a terminal plate, a composite MEA, one or more repeat units consisting of (1) a bipolar plate and (2) a composite MEA, and a second terminal plate.

Additional bipolar plates and MEAs may be added to the cassette assembly, with or without the addition of cooling layers depending upon the output requirements for the finished fuel cell. Typically, fuel cells having a plurality of composite MEAs comprise a repeat unit having between 1 and about 10 composite MEAs interposed between coolant layers. More typically there are between about 2 and about 4 composite MEAs interposed between coolant layers which strikes a balance between maximizing power density and maintaining a sufficient heat removal throughout the cassette or stack.

Figure 16:
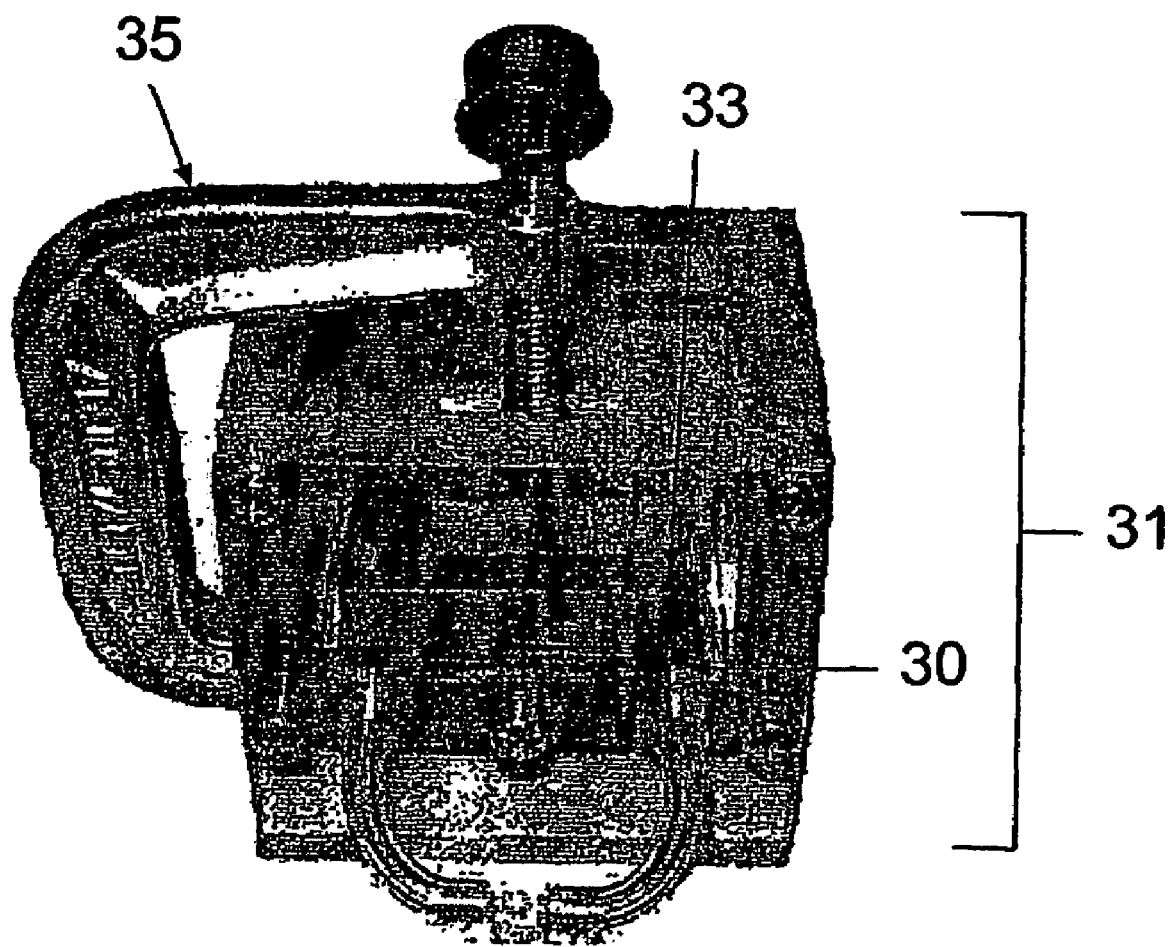
FIG. 16 is a photographic image of a fuel cell assembly within the mold and prior to encapsulation.

Although example assembly designs have been described, those skilled in the art will recognize that fuel cells can have any desired number of components assembled together depending upon the output requirements of the final fuel cell cassette. Moreover, one skilled in the art would recognize that the composite MEAs provided herein are suitable for use in any one of the cassette designs recited in World Publications WO 02/43173, WO 03/036747, and WO 03/092096, the entirety of which are incorporated by reference. Regardless of the particular design, the components are assembled such that the ports of each component in the assembly are aligned with the ports of the other components. As shown in FIG. 16, the assembly 30 is placed within a mold or cavity 31 and held in place within the mold by a top plate 33 with an appropriate means of compression 35, such as a simple clamp or bolt pattern. If sealant holes are utilized, the top plate will also contain holes through which the sealant can be introduced into the assembly.

To seal the fuel cell cassette assembly described above using vacuum assisted resin transfer molding techniques, a sealant is introduced around the perimeter and into the sealant holes of all assembled components. A vacuum is pulled through each of the ports within the assembly. The pressure differential pulls sealant into the edges of the assembly thereby sealing the periphery of the components in the assembly together and forming the assembly into a finished fuel cell cassette. In addition, the same pressure differential pulls the sealant into the channels or grooves present in the composite MEA or optionally the bipolar plate. If sealant holes are present, the pressure differential pulls or otherwise draws the sealant through the sealant holes into the grooves. The perimeter and port sealing is complete when the sealant flows through the grooves to meet and seal off the appropriate ports. Throughout the cassette assembly, each flow field is appropriately sealed such that only the manifold ports of interest remain open on each individual layer. The remaining ports are selectively blocked/enclosed by the grooves that are now sealed. The edges of the assembly are also encapsulated by sealant. The pressure differential and time required to accomplish the sealing process is a function of the materials used for the components and the sealant, including but not limited to the shape of the sealing grooves and the viscosity and flow characteristics of the sealant.

Alternatively, one can use pressure assisted resin transfer to push a low viscosity sealant into the sealant holes and/or around the periphery of the assembly. Two part thermoset resins with a viscosity of under 150,000 cP, more preferably under 100,000 cP, allow filling of the sealing channels and the stack exterior with a minimum of driving pressure (<10 PSI) in very short fill times (<1 minute). In addition, design of the fuel cell components and the sealing channels is not complicated by the ramifications of high pressure filling techniques and tighter tolerances typically required.

To seal a fuel cell cassette using injection molding techniques, sealant is mechanically forced around the periphery of the assembly and into any sealant holes. In a preferred embodiment, a thermoset resin is utilized as the sealant and is injected into the injection holes and around the edges of the assembly and allowed to harden prior to removal of the fuel cell cassette from the mold. In another embodiment, a thermoplastic resin is utilized as the sealant. The sealant is injected into the injection holes and around the edges of the assembly and allowed to cool and harden prior to removal of the fuel cell cassette from the mold. A mold capable of accommodating the associated temperature and pressure is utilized.

Thus, methods of fabricating fuel cells and related electrochemical cassettes provided herein permit rapid prototype design and optimization. These fabrication methods are additionally suitable for low to medium volume production of electrochemical or fuel cell cassettes (i.e., <100,000 units) using either resin transfer or low pressure injection molding techniques. In particular, cassettes of the invention can be produced at reduced/low pressures. In addition, cassettes of the invention have an increased electrochemically active cross-section for a given cassette size. That is, less of the cassette has to be utilized (sacrificed) for sealing purposes.

The reduced cross-sectional area required of the low pressure sealing techniques of the invention permits greater flexibility in reagent delivery and removal from flow fields within the cassettes. Consequently, reagent depletion in the flow field is reduced or eliminated. Thus, for example, each flow field could be supplied with a reagent from two or more reagent manifolds and waste could be removed from the flow field via two or more exhaust manifolds.

Increased flow field design flexibility further permits increased cassette efficiency and further allows for scalability of cassette design. That is, the invention contemplates cassettes having larger or smaller power outputs generated from cassettes which are typically smaller than existing fuel cell stacks with a similar power output.

The sealant used for periphery and port sealing is selected such that it has the required chemical and mechanical properties for the conditions found in an operating fuel cell system, including but not limited to temperature stability. Suitable sealants include both thermoplastics and thermoset elastomers. Preferred thermoplastics include thermoplastic olefin elastomers, thermoplastic polyurethane, plastomer, polypropylene, polyethylene, polytetrafluoroethylene, fluorinated polypropylene and polystyrene. Preferred thermoset elastomers include epoxy resins, urethanes, silicones, fluorosilicones, and vinyl esters.

Figure 17:
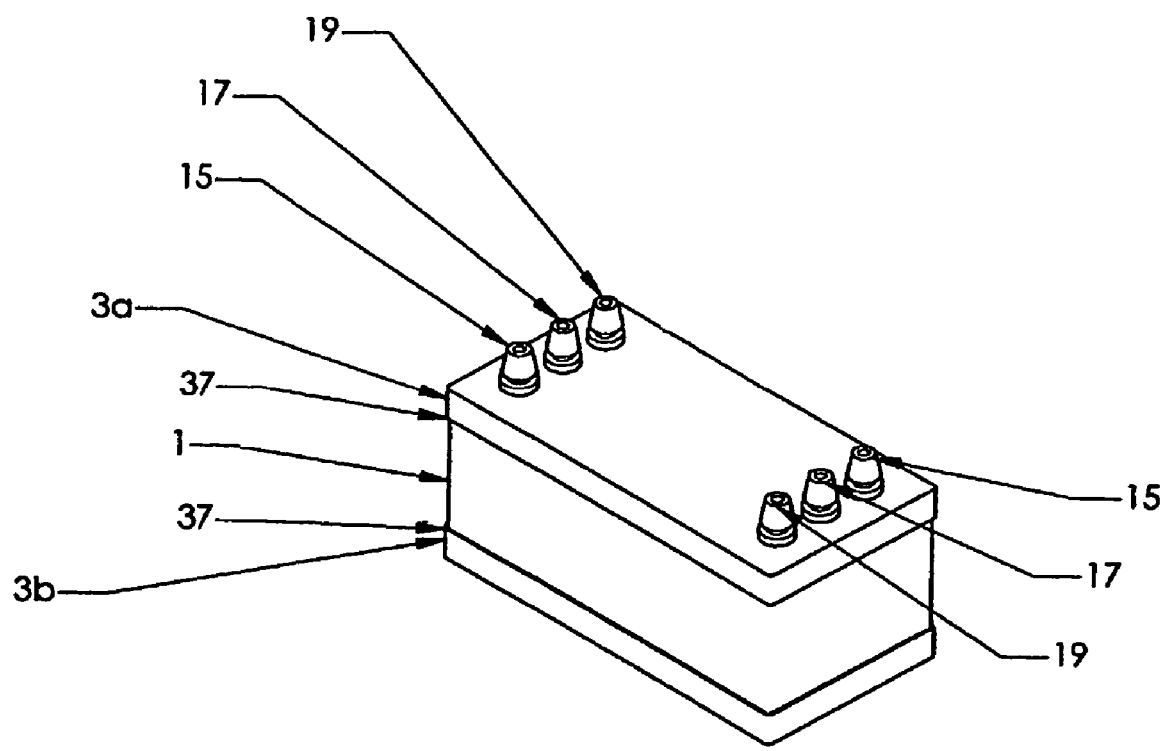
FIG. 17 is a schematic top and side view of a fuel cell cassette of the present invention having bonded endplates.

In an alternate embodiment shown in FIG. 17, endplates 3a and 3b are bonded 37 directly to the fuel cell cassette 10 during the sealing steps described above. Several benefits result from the use of this embodiment. Removing the need to compress the fuel cell cassette between end plates improves the reliability of the fuel cell stack and substantially decreases the weight. Also, the incorporated end plates can include fittings to further simplify the fuel cell stack. In one preferred embodiment, connections to external fuel, oxidant and coolant flows are added to the terminal plates used in the stack such that the terminal plates function as endplates for the stack.

Figure 6:
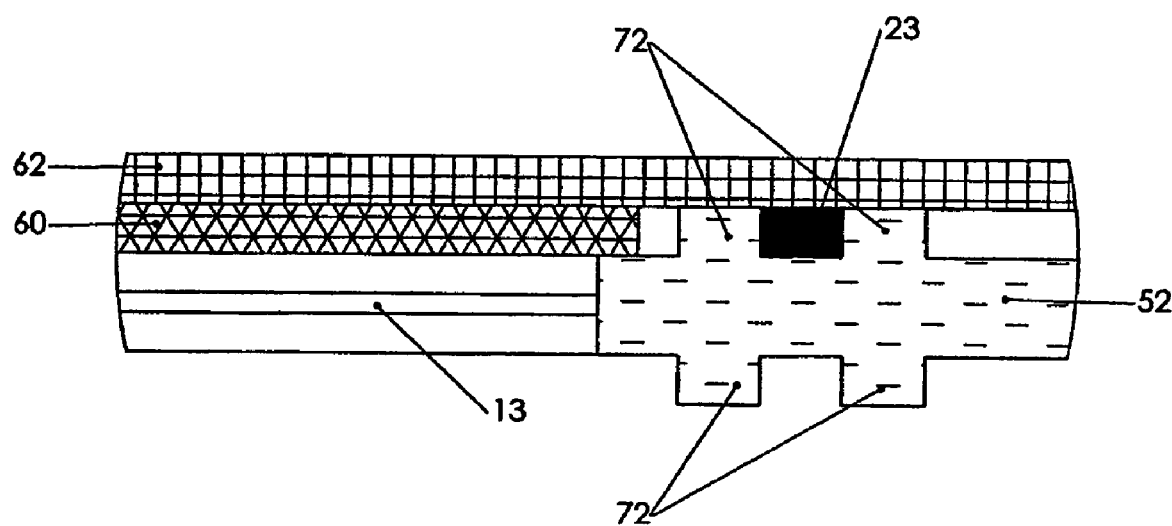
FIG. 6 is a cut away view of a composite MEA with edge gaskets incorporating sealant channels, including flow field and separator plate.
Figure 9:
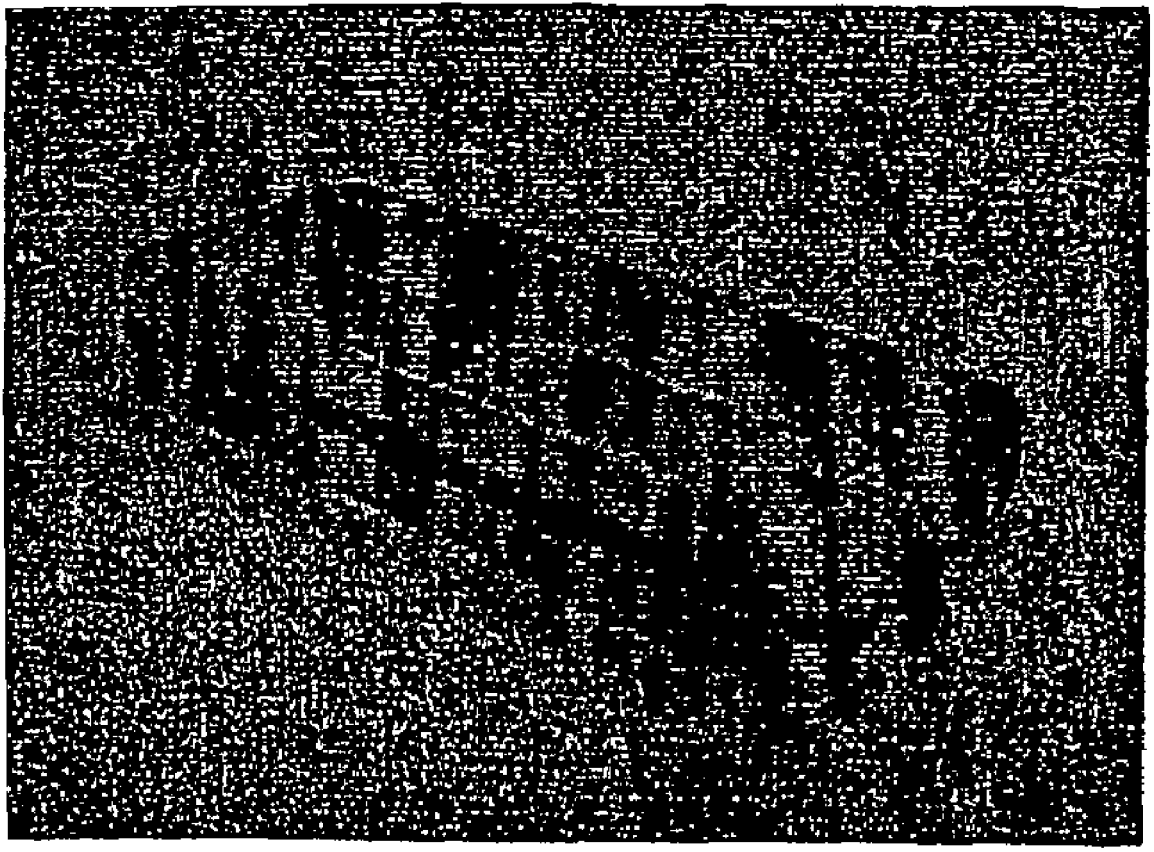
FIG. 9 is an image of a stack prepared by assembly of the components depicted in FIG. 10.
Figure 11:
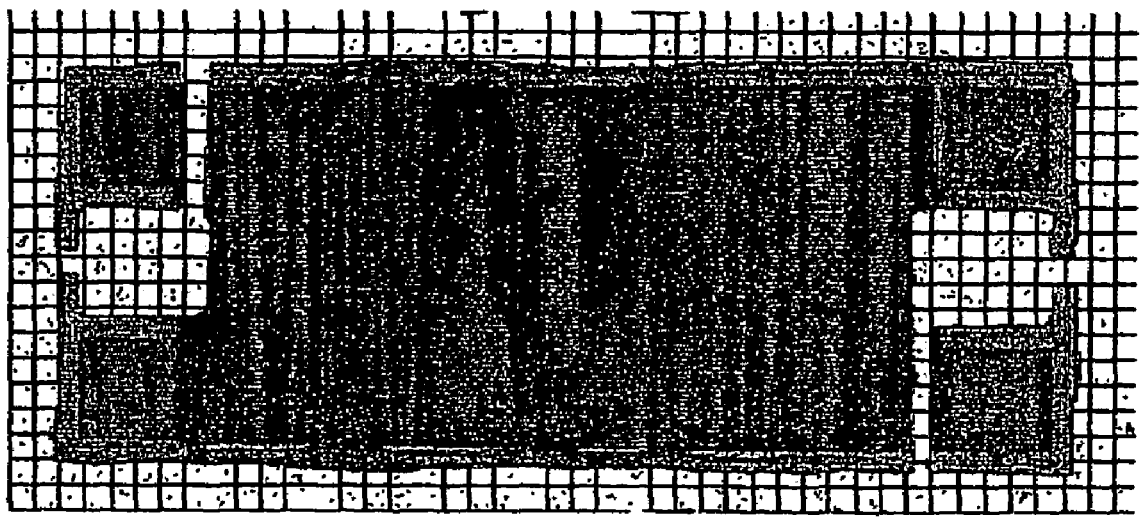
FIG. 11 is an image of the composite MEA shown in FIG. 2 after a sealant resin has been incorporated into the raised channels and about the periphery of the composite MEA.

In another preferred embodiment, the invention provides cassettes having sealing channels 23 which are molded into the gasket 52 of the composite MEA 50. This allows significant simplification of the other portions of the stack, particularly simplification of the non-porous separator plate. As depicted in FIG. 6, the composite MEA allows the use of discrete flow fields 60 and one separator plate 62 in the place of a bipolar plate, where each flow field is situated within a space defined by the surface of the MEA, the surface of the separator plate and the height of the elevated ridges and/or raised channels of the gasket portion of the composite MEA. Rather than forming an edge gasket around the MEA that is flat, composite membranes are prepared which comprise a gasket 52 that incorporates elevated ridges and/or the raised channels, i.e., sealing channels 23, into the gasket of the composite MEA which regulate the flow of sealant into and through the assembled stack during the sealing process. A stack can subsequently be made with simple flow fields 60 (e.g. metal screens) and flat separator plates 62 (e.g. sheet stock). Alternatively, a flat plate can be stamped to provide one or more flow fields in conjunction with a separator. During the fabrication of the cassette the sealant is introduced from the edges of the stack (or through sealant holes in the stack components). The sealant travels through the channels 23 incorporated in the gasket 52 of the MEA and/or until blocked by further infiltration into the stack by a seal formed between an elevated ridge and an opposing surface (e.g., a bipolar plate or a separator plate). Bonding by setting, hardening, solidifying, cooling or other curing process results in a seal between the gasket portion of the composite MEA and the separator plate 62. See, e.g., FIG. 6 and FIG. 11.

Composite MEAs 50 (which may also be referred to herein as a "gasketed MEA"), which are suitable for use in the present invention comprise a central laminated MEA 13 (NAFION type persulfonated ionomer layer laminated between catalyzed carbon paper layers) and a nonconductive, non-porous gasket 52 bonded to the periphery of the laminated MEA (FIG. 5). The gasket 52 is typically prepared from a thermoset or thermoplastic material and is cast, molded or otherwise formed about the periphery of the laminated MEA. In preferred embodiments the gasket is formed using a mold having grooves suitable for formation of one or more elevated ridges or raised channels.

Certain preferred composite MEAs are prepared by formation of the gasket by vacuum assisted resin transfer molding or injection molding. Thus, an MEA is placed in the mold depicted in FIG. 3 and FIG. 4. Resin is introduced about the periphery of the MEA such that the resin blinds the edges of the GDLs to form a robust bond between the MEA and the gasket. The mold shape comprises one or more grooves corresponding in location and the dimensions of the raised channels and/or elevated ridges required to block the periphery of the MEA and to guide the sealant around those manifolds which do not provide or remove material from a particular flow field.

During the gasket formation process, typically one or more reagent, coolant, or sealant manifold openings are provided (alternatively manifold openings may be incorporated after gasket formation by cutting or punching the necessary openings in the gasket and/or MEA). The gasket portion of the composite MEA further comprises one or more elevated ridges and/or channels for controlling and directing the flow of a sealant material during the sealing process. Typically the height of the elevated ridges or raised channels is approximately the same as the thickness of the flow field screen or the elevated flow field which is in relief on the surface of the bipolar plate.

In certain embodiments at least a portion of the gasket has a thickness greater than that of the laminated MEA. These elevated ridges are designed to block sealant, e.g., sealant resin, from entering the flow fields or the reagent or sealant manifolds. Thus, as depicted in FIG. 7, periphery of the flow field, including the area surrounding the manifold openings intended to deliver material to the flow field, are surrounded by an elevated ridge on the gasket portion of the MEA. Elevated ridges 72 and raised channels 23 (two or more substantially parallel elevated ridges 72 which form a channel 23 through which a sealant may flow) are arranged in the gasket portion to seal the periphery of the MEA and to surround those manifold openings which are not intended to interact with the flow field. Thus, the elevated ridges or the raised channels of the gasket portion of the gasketed MEA form a sealant impermeable interface with a surface of adjacent separator plates or flat edges of a bipolar plate such that sealant introduced into the stack is unable to pass the elevated ridges.

In certain-embodiments, cassettes comprising flow field screens preferably comprise screens having dimensions suitable for assembly between the surfaces of adjacent a MEA and a separator plate where the cross section of the screen is defined by that portion of the peripheral gasket forming a seal with the separator plate, e.g., the three dimensional space defined by adjacent surfaces of the MEA and separator plates and the peripheral edge gasket of the composite MEA. The final separation distance is defined by the thickness of the flow field screen. A stack is then assembled by alternating conductive separator plate (which is typically without surface patterning) with gasketed MEAs having flow field screens interposed between the MEA and the separator plates.

FIG. 8A and FIG. 8B provide a bipolar plate comprising a serpentine series of ridges which define the flow field and direct reagents to flow past substantially all of the MEA between the delivery and exhaust manifolds connected to the flow field. Alternatively a series of elevated lands, e.g., a plurality of polygonal or circular protrusions from the bipolar plate surface such as the array of rectangular lands depicted in FIG. 12 may be incorporated as the flow field in bipolar plates. Preferred bipolar plates comprise a substantially planar surface about the flow field region capable of interfacing with the elevated ridges and/or the raised channels of the gasket portion of the gasketed MEA such that a sealant or other materials are precluded from the flow field or manifold openings during the sealing or encapsulation process. Bipolar plates can be machined or molded from carbon/polymer composites. Alternatively, they can be stamped from metal sheet stock.

Alternatively, each flow field is formed in the surface of a bipolar plate and composite MEA are assembled to form a cassette. Preferably one or more channels are present in the molded gasket or etched in the bipolar plate surface such that the components are bonded together and each manifold which is intended to be isolated from a flow field is surrounded by sealant.

Moreover, sealing against the gasket portion of the composite MEA minimizes or prevents exposure of a portion of cross-section of an MEA surface to a reagent not being introduced into the flow field in contact with that MEA surface. More particularly, the manifold openings providing fuel and oxidant are only exposed to the gasket portion of the composite MEA which is typically not electrochemically active. Thus, the surface of the MEA which is in contact with an oxidant flow field is precluded from exposure to the fuel on that surface because the laminated GDL/MEA structure of the composite MEA is not in contact with, for example, the fuel manifold.

In cassettes comprising a coolant manifold, the manifold opening is preferably only exposed to the gasket portion of the composite MEA. Such an arrangement reduces or precludes coolant induced damage to the MEA and/or the cassette.

In another aspect, the present invention provides stacks suitable for use in fuel cells, electrochemical or ion exchange applications. Stacks of the invention comprise at least one cassette of the present invention, and at least one end plate having openings which align with the reagent manifold openings of the cassette. Each cassette is assembled relative to each other such that the reagent manifold openings are aligned. The end plate is assembled on the top and/or bottom of the stack of fuel cell cassettes such that the openings in the end plates align with the reagent manifold openings.

The means by which the end plates and fuel cell cassettes are assembled to form the fuel cell stack provided by the present invention is not particularly limited and may include compression gasket seals and co-encapsulation in a resin and/or sealant. In preferred embodiments, the end plate is assembled with the fuel cell cassette prior to encapsulation by the resin and prior to introduction of the sealant such that the end plate and fuel cell cassette are encapsulated and sealed in combination, e.g., simultaneously.

In other preferred embodiments of the present invention, one or more fuel cell cassettes are manufactured, then aligned in a stack together with one or more compression gaskets and end plates. A compression means such as through bolt, tie downs or other mechanical fasteners are attached to the fuel cell stack to mechanically seal the fuel cell cassettes and end plates.

The layer size and number of layers in the cassettes or stacks of the invention are not particularly limited. Typically each flow field and/or membrane assembly will be between about 1 $cm^2$ and about 1 $m^2$, however larger and smaller flow field layers and/or membrane assembly layers may be suitable in certain applications. The layer size and number of layers in the fuel cell cassettes of the invention may be configured to produce a sufficient power supply for a variety of applications. Frequently the power output fuel cell cassettes and fuel cell cassettes of the invention will range from about 0.1 W to about 100 kW or more preferably from about 0.5 W to about 1 or about 10 kW. Other preferred fuel cell cassettes of the invention will range from about 5 W to about 1 kW.

The pressure differential and time required to accomplish the sealing process is a fiction of the materials used in the fuel cell cassette construction. These include the sealant channel geometry, the viscosity and flow characteristics of the resin, and the type of gas diffusion layer used in the MEA. Those skilled in the art will be able to judge the appropriate time and pressure based on these parameters. Those practicing the invention may also ascertain the most appropriate time and pressure by visual inspection during the sealing process with the use of transparent molds through which the resin progress can be seen in the topmost layer of the assembly.

Preferred fuel cell cassettes of the present invention are further illustrated by means of the following illustrative embodiment, which is given for the purpose of illustration only and is not meant to limit the invention to the particular components and amounts disclosed therein.

Example 1

2 Cell Stack Performance Data

Figure 3:
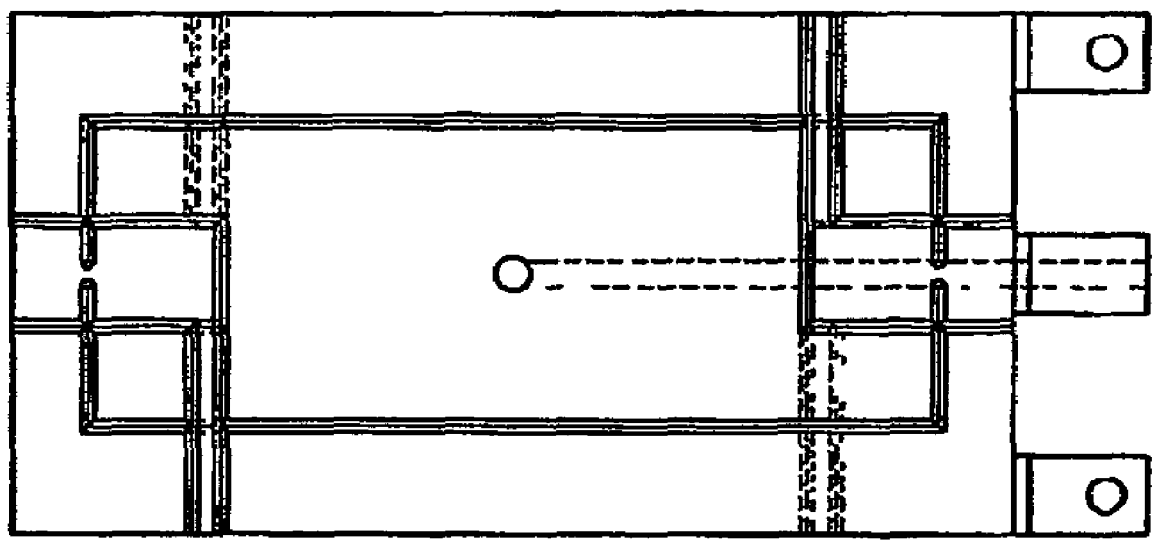
FIG. 3 is a schematic top view of a mold suitable for formation of certain composite MEAs suitable for use in the stacks of the invention.
Figure 4:
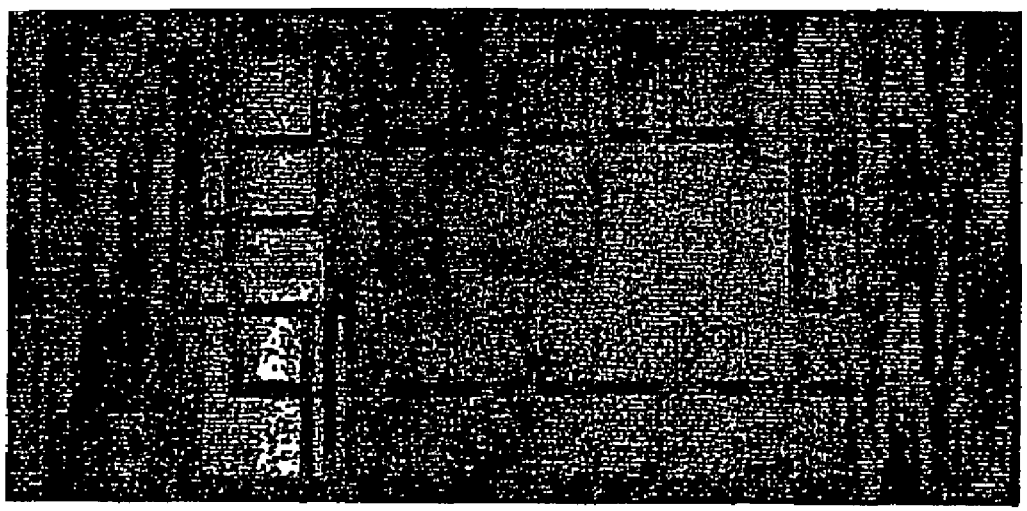
FIG. 4 is a photographic image of the composite MEA mold shown schematically in FIG. 3.
Figure 10:
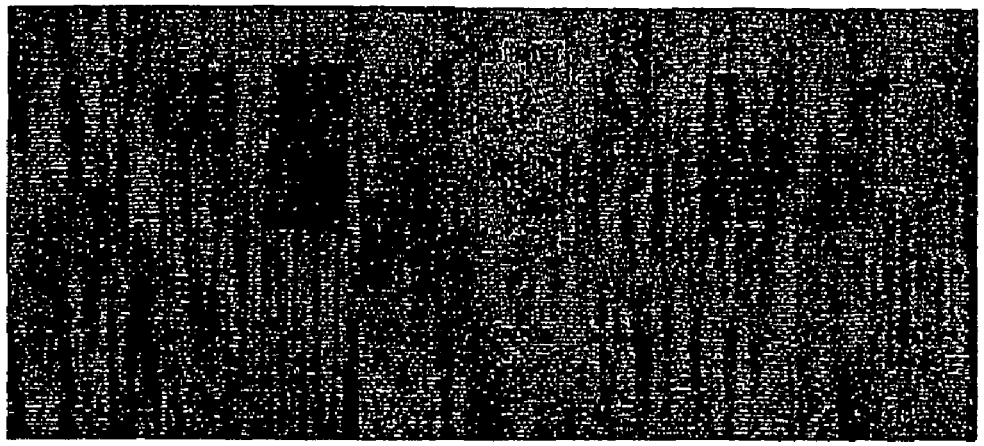
FIG. 10 is a photographic image of the components used to assemble the stack recited in Example 1 and depicted in FIG. 9 and comprises a top end plate (1), flow screens (2, 4, 6, and 8), two composite MEAs (3 and 7), a separator plate (5) and a bottom end plate (9) not shown.

Using the ridge and raised channel pattern depicted in FIG. 7, composite MEAs depicted in FIG. 2 were molded from commercial MEAs and silicone resin using the gasket mold depicted in FIG. 3 and FIG. 4. Separator plates were cut from plate stainless steel and flow fields were cut from stainless steel mesh. Each component is depicted in FIG. 10, e.g., two composite MEAs, four flow field screens, one separator plate, and two end plates were assembled in the mold in the following order: end plate, flow field screen, composite MEA, flow field screen, separator plate, flow field screen, composite MEA, flow field screen, and end plate. The assembly was encapsulated with the silicone resin, Silastic, (available commercially from The Dow Corning Corporation of Midland, Mich., USA) by pushing the resin into the sealant holes with a hand dispenser.

Table 1 shows total voltage, cell voltage, current and current density for the fuel stack assembly above described. Operating conditions were 50 C stack temperature, dead end hydrogen (with regular purge), and 1 LPM of air (humidified at 50 C).

TABLE 1

| V | V/2 | C | $mA/cm^2$ |
|---|---|---|---|
| 1.92 | 0.96 | 0 | 0 |
| 1.8 | 0.9 | 0.03 | 2.678571 |
| 1.6 | 0.8 | 0.39 | 34.82143 |
| 1.4 | 0.7 | 1.46 | 130.3571 |
| 1.32 | 0.66 | 1.83 | 163.3929 |
| 1.2 | 0.6 | 2.55 | 227.6786 |
| 1 | 0.5 | 3.93 | 350.8929 |

Example 2

Standard Injection Molding

Few changes would be made in the above described scheme to employ automated injection molding. With the use of two part resins (e.g., the silicone used in Example 1), we have shown that the resin can be injected into the channels by a diving pressure rather than pulling a vacuum on the internal ports. For traditional injection molding of a thermoplastic resin, the mold used would have to accommodate the temperature and pressure associated. Molten resin would be injected into the injection holes and around the edges of the assembly, allowed to cool and harden. Injection velocity profile, pack pressure, and cooling time would be optimized to minimize the possibility of component damage as well as to control shrinkage/warpage ensuring sealing of the final part. Lastly, the fuel cell cassette would be removed from the mold.

The foregoing description of the present invention is merely illustrative thereof, and it is understood that variations and modification can be made without departing from the spirit or scope of the invention.

What is claimed is:

1. An electrochemical cassette comprising at least one electrochemical cell which comprises:
   a composite membrane electrode assembly (MEA) having a molded gasket bonded to the periphery of the MEA, wherein the gasket comprises at least one reactant manifold opening extending through the thickness thereof and at least one sealant channel or port;
   a fuel flow field, an oxidant flow field, and a separator plate, each component having at least one reactant manifold opening extending through the thickness thereof;
   wherein the one or more composite MEA, the oxidant flow field, the fuel flow field, and the separator plate are assembled and encapsulated about the periphery thereof by a sealant; and
   wherein the sealant contemporaneously seals the respective channels to selectively block those reactant manifold openings which are not intended to deliver material to a particular flow field.

2. The electrochemical cassette of claim 1, wherein cassette further comprises at least one coolant flow field and wherein each membrane electrode assembly and each plate further comprise at least one coolant manifold opening wherein each coolant manifold opening extends through the thickness of the cassette.

3. The electrochemical cassette of claim 1, wherein a separator plate and one or two flow fields are integrated into a bipolar plate.

4. The electrochemical cassette of claim 3, wherein each bipolar plate has zero or one oxidant flow field and has zero or one fuel flow field.

5. The electrochemical cassette according to claim 3, wherein at least one bipolar plate comprises a coolant flow field.

6. The electrochemical cassette of claim 3, wherein a first bipolar plate comprises a first coolant flow field and a second bipolar plate which are aligned to form a coolant passage.

7. The electrochemical cassette of claim 3, wherein the bipolar plate is machined or molded out of at least one of a carbon/polymer composite, graphite or metal.

8. The electrochemical cassette of claim 3, wherein the bipolar plate is stamped from a metal sheet.

9. The electrochemical cassette of claim 1, wherein each membrane electrode assembly is in contact with a fuel flow field and an oxidant flow field.

10. The electrochemical cassette according to claim 1, wherein the electrochemical cassette is a fuel cell cassette.

11. The electrochemical cassette of claim 1, wherein each composite MEA comprises:
    a MEA comprising an ion conductive layer interposed between two gas diffusion layers which comprise a catalyst, and
    a molded gasket bonded to the periphery of the MEA.

12. The electrochemical cassette of claim 11, wherein the composite MEA comprises a molded gasket which interpenetrates a portion of the gas diffusion layers of the MEA.

13. The electrochemical cassette according to claim 12, wherein a separator plate and one or two flow fields are integrated into a bipolar plate and each flow field comprises a series of ridges or protrusions etched in the surface of the bipolar plate.

14. The electrochemical cassette of claim 1 wherein at least one surface of at least one separator plate has one or more sealant channels.

15. The electrochemical cassette of claim 14, wherein at least a portion of the bipolar plate sealant channels is adjacent to the gasket of the membrane electrode assembly.

16. The electrochemical cassette of claim 15, wherein the sealant channel is adjacent to the interface of the gasket and the membrane electrode assembly.

17. The electrochemical cassette of claim 1, wherein at least one sealant channel is interposed between each membrane electrode assembly and each plate or between adjacent plates.

18. The electrochemical cassette according to claim 1, wherein the molded gasket is composed thermoset or thermoplastic material.

19. The electrochemical cassette of claim 18, wherein the thermoplastic material is selected from the group consisting of thermoplastic olefin elastomers, thermoplastic polyurethane, plastomer, polypropylene, polyethylene, polytetrafluoroethylene, fluorinated polypropylene and polystyrene.

20. The electrochemical cassette of claim 18, wherein the thermoset material is selected from the group consisting of epoxy resins, urethanes, silicones, fluorosilicones, and vinyl esters.

21. The electrochemical cassette of claim 20, wherein the thermoset material has a viscosity of between about 10,000 and 150,000 cP.

22. The electrochemical cassette of claim 20, wherein the thermoset material has a viscosity of between about 10,000 and 55,000 cP.

23. The electrochemical cassette according to claim 1, wherein the sealant is a thermoset or a thermoplastic material.

24. The electrochemical cassette of claim 23, wherein the thermoplastic material is selected from the group consisting of thermoplastic olefin elastomers, thermoplastic polyurethane, plastomer, polypropylene, polyethylene, polytetrafluoroethylene, fluorinated polypropylene and polystyrene.

25. The electrochemical cassette of claim 23, wherein the thermoset material is selected from the group consisting of epoxy resins, urethanes, silicones, fluorosilicones, and vinyl esters.

26. The electrochemical cassette of claim 1, wherein at least a portion of the sealant channels open to the peripheral edge of one or more plates of the cassette such that the sealant is introduced into the sealant channel during encapsulation of the cassette.

27. The electrochemical cassette of claim 1, wherein each membrane electrode assembly and plate further comprises at least one sealant hole extending through the thickness thereof, and wherein the sealant holes are in contact with at least a portion of one or more sealant channels.

28. The electrochemical cassette of claim 27, wherein at least a portion of the sealant channels are open to the peripheral edge of one or more composite MEAs or plates of the cassette.

29. The electrochemical cassette of claim 28, wherein the sealant is introduced into the fuel cell cassette through one or more of the sealant holes or through the sealant channel openings about the periphery of the plates.

30. The electrochemical cassette of claim 29, wherein the sealant is introduced by pressure assisted resin transfer or by vacuum assisted resin transfer.

31. The electrochemical cassette of claim 30, wherein the sealant or resin is introduced under a pressure differential of between about +5 psi and about −15 psi.

32. The electrochemical cassette of claim 30, wherein the sealant is introduced by pressure assisted resin transfer under a positive pressure of between 0 psi and about 50 psi.

33. The electrochemical cassette of claim 30, wherein the sealant or resin is introduced by vacuum assisted resin transfer under a partial pressure of between about 750 Torr and about 1 mTorr.

34. A fuel cell stack comprising:
    (a) at least one electrochemical cassette according to any one of claims 1 through 33;
    (b) at least one end plate having one or more openings which align with the reactant manifold opening(s);
    wherein the end plate is assembled on the top and/or bottom of the stack of one or more electrochemical cassettes such that the openings in the end plate align with the fuel manifold openings, the oxidant openings, and optionally the coolant manifold openings.

35. The fuel cell stack of claim 34, wherein the end plate is assembled with the electrochemical cassette(s) prior to encapsulation and prior to introduction of the sealant such that the end plate and fuel cell cassettes(s) are encapsulated and sealed in combination.

36. The fuel cell stack of claim 35, wherein a compression means is applied to the stack to provide additional compressive force to the fuel cell stack.

37. The fuel cell stack of claim 35, wherein the end plate is attached to one or more electrochemical cassettes after encapsulation of the electrochemical cassette(s).

38. The fuel cell stack of claim 35, wherein the end plate is attached by a compressive seal.

39. The fuel cell stack of claim 35, wherein at least one of the end plates is composed of a thermoset polymer, a thermoplastic polymer, a metal, or a metal alloy.

40. The fuel cell stack of claim 35, wherein at least one of the end plates is composed of a filled polymer composite.

41. The fuel cell stack of claim 40, wherein the filled polymer composite is a glass fiber reinforced thermoplastic or a graphite reinforced thermoplastic.

42. A composite membrane electrode assembly (MEA) having a molded gasket bonded to the periphery of the MEA, wherein the gasket comprises at least one reactant manifold opening extending through the thickness thereof and at least one sealant channel or port defined by at least one elevated ridge, and wherein the MEA comprises an ion conductive material interposed between two gas diffusion layers.

43. The MEA of claim 42, wherein the at least one elevated ridge is two parallel elevated ridges that define a raised channel therebetween.

44. The MEA of claim 43, wherein the raised channel is substantially perpendicular the periphery at a location.

45. The MEA of claim 44, further comprising a sealant introduced into the raised channel via the location.

46. The MEA of claim 45, wherein the sealant closes off an unused port.

47. The MEA of claim 46, further comprising components coupled to the gasket, the components defining at least one sealant hole for receiving the sealant to further close off an unused port.

48. The MEA of claim 45, wherein the sealant bonds the gasket to a separator plate that encloses the raised channel.

* * * * *